(12) United States Patent
Khan et al.

(10) Patent No.: US 9,441,603 B2
(45) Date of Patent: Sep. 13, 2016

(54) APPARATUS FOR PROVIDING CONCENTRATED INDUCTIVE POWER TRANSFER

(71) Applicant: Lear Corporation, Southfield, MI (US)

(72) Inventors: Aftab Ali Khan, Dearborn, MI (US); Veda Prakash Galigekere, Farmington Hills, MI (US); Madhur Bhattacharya, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 377 days.

(21) Appl. No.: 14/014,802

(22) Filed: Aug. 30, 2013

(65) Prior Publication Data

US 2014/0060505 A1    Mar. 6, 2014

Related U.S. Application Data

(60) Provisional application No. 61/696,995, filed on Sep. 5, 2012.

(51) Int. Cl.
*H02J 7/00*    (2006.01)
*F02P 7/00*    (2006.01)
*B60L 11/18*    (2006.01)

(52) U.S. Cl.
CPC .............. *F02P 7/00* (2013.01); *B60L 11/182* (2013.01); *B60L 11/1833* (2013.01); *B60L 2200/12* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ........................................................ F02P 7/00
USPC ................................................ 320/108, 109
See application file for complete search history.

(56) References Cited

U.S. PATENT DOCUMENTS

| | | | |
|---|---|---|---|
| 7,239,110 B2 | 7/2007 | Cheng et al. | |
| 7,714,537 B2 | 5/2010 | Cheng et al. | |
| 7,880,337 B2 | 2/2011 | Farkas | |
| 8,008,888 B2 * | 8/2011 | Oyobe | B60L 5/005 320/104 |
| 8,373,310 B2 * | 2/2013 | Baarman | H01F 38/14 307/104 |
| 8,482,250 B2 * | 7/2013 | Soar | H01F 38/14 320/104 |

(Continued)

FOREIGN PATENT DOCUMENTS

| | | |
|---|---|---|
| DE | 102007033654 A1 | 4/2008 |
| DE | 102008013649 A1 | 10/2009 |

(Continued)

OTHER PUBLICATIONS

Covic et al., "Inductive Power Transfer (IPT) Power Our Future", Power Electronics Research Group, Department of Electrical and Computer Engineering, The University of Auckland, New Zealand, Auckland Uniservices Ltd., 2010, 126 pages.

(Continued)

*Primary Examiner* — Richard V Muralidar
(74) *Attorney, Agent, or Firm* — Brooks Kushman P.C.

(57) ABSTRACT

An inductive charging coil assembly for a vehicle is provided. The assembly comprises a first base plate including at least one first coil thereon for receiving magnetic flux to charge a vehicle battery. The assembly further comprises a second base plate including at least one second coil having a top surface thereof that forms an elevated portion to focus the magnetic flux to the at least one first coil.

20 Claims, 6 Drawing Sheets

(56) References Cited

U.S. PATENT DOCUMENTS

| | | |
|---|---|---|
| 2011/0181240 A1 | 7/2011 | Baarman et al. |
| 2012/0103741 A1 | 5/2012 | Suh et al. |
| 2013/0049682 A1 | 2/2013 | Niec et al. |
| 2013/0175983 A1 | 7/2013 | Partovi et al. |

FOREIGN PATENT DOCUMENTS

| | | | |
|---|---|---|---|
| DE | 102009049432 A1 | | 4/2011 |
| JP | 2002305121 | * | 10/2002 |
| JP | 2002305121 A | | 10/2002 |
| JP | 2010283263 A | | 12/2010 |
| JP | 2011130614 A | | 6/2011 |
| WO | 2010117139 A2 | | 10/2010 |
| WO | 2010131983 A1 | | 11/2010 |
| WO | 2011045883 A1 | | 4/2011 |
| WO | 2011084936 A2 | | 7/2011 |
| WO | 2012019664 A2 | | 2/2012 |

OTHER PUBLICATIONS

Chinese Office Action for corresponding Appln. No. 201310398975.X, mailed Feb. 28, 2015, 8 pages.
German Office Action for corresponding Application No. 10 2013 217 636.8, mailed May 9, 2014, 5 pages.

* cited by examiner

APPARATUS FOR PROVIDING CONCENTRATED INDUCTIVE POWER TRANSFER

CROSS-REFERENCE TO RELATED APPLICATIONS

This application claims the benefit of U.S. provisional Application No. 61/696,995 filed Sep. 5, 2012, the disclosure of which is incorporated in its entirety by reference herein.

TECHNICAL FIELD

Embodiments disclosed herein generally relate to an apparatus for providing concentrated inductive power transfer.

BACKGROUND

Various forms of inductive charging are known. For example, U.S. Publication No. 2011/0181240 to Baarman et al. ("Barraman") discloses an inductive charging system for electric vehicle (Title). In particular, Baarman discloses a charging system for an electric vehicle that assists in aligning a primary charging coil and a secondary coil. The system may include a wheel chock that raises the primary coil into alignment with the secondary coil when a tire enters the wheel chock. The system may include a primary that is recessed below the surface supporting the vehicle and is protected by a cover. The secondary coil may be protected and supported by a skid plate mounted to the vehicle. The system may include a charging circuit that is controlled by signals transmitted by a garage door opener transmitter or a garage door opener. The system may include sensors that detect the presence of an animal or object in the space between the primary coil and the secondary coil.

In addition, International Publication No. WO 2010/131983 A1 to Boys et al. ("Boys") provides an electric auto cycle support apparatus comprising an auto cycle engagement device adapted to support an auto cycle. The engagement device includes a coil adapted to provide a magnetic field for inductively charging an auto cycle supported by the apparatus. Boys also provides an electric auto cycle start and charging system.

SUMMARY

In one embodiment, an inductive charging coil assembly for a vehicle is provided. The assembly comprises a first base plate including at least one first coil thereon for receiving magnetic flux to charge a vehicle battery. The assembly further comprises a second base plate including at least one second coil having a top surface thereof that forms an elevated portion to focus the magnetic flux to the at least one first coil.

In another embodiment, an inductive charging coil assembly for a vehicle is provided. The assembly comprises a first base plate including a secondary coil thereon for receiving magnetic flux to charge a vehicle battery. The assembly further comprises a second base plate including at least one primary coil having a top surface thereof that forms an elevated portion to focus the magnetic flux to the secondary coil.

In another embodiment, an inductive charging coil assembly for a vehicle is provided. The assembly comprising a first base plate including at least one secondary coil thereon for receiving magnetic flux to charge a vehicle battery. The assembly further comprises a second base plate including at least one primary coil including an elevated portion to focus the magnetic flux to the at least one first coil.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Inductive charging, also known as wireless charging utilizes a primary coil and a secondary coil that is spaced apart from one another. The primary coil may be positioned in a base pad whereas the secondary coil may be placed on the device that is to receive energy for battery charging purposes. The primary coil and the secondary coil combine with one another to form an electrical transformer. The primary coil creates an alternating electromagnetic field or time varying magnetic field and transmits the same to the secondary coil. In turn, the secondary coil generates voltage in response to the magnetic field through, which is then converted into an electrical current. The voltage and current provide the power to charge the battery.

It is recognized that an inductive charging system may include a plurality of primary coils and secondary coils. In general, the plurality of primary coils may be positioned within a base pad that is planar with a generally zero radius of curvature along a plane in which the base pad lies. Likewise, the secondary coils may also be positioned on the device to be charged in a planar orientation (or flat orientation). While such planar orientations of the primary and second coils are useful, an approach that improves the concentration of the magnetic flux as it is passed from the primary coils and onto the secondary coil may improve charging efficiency and reduce the effects of leakage magnetic flux. Embodiments disclosed herein generally provide for at least one first coil that includes or forms a curved or inclined portion (e.g. elevated portion) or a base pad that is elevated while incorporating a planar first coil for focusing flux therefrom onto a second coil to provide a concentrated flow of the magnetic flux from the first coil to the second coil. Further, it is recognized that the embodiments disclosed herein may be incorporated into co-pending provisional application 61/696,996, entitled "Multi-Mode Battery Charger," filed on Sep. 5, 2012, which is hereby incorporated by reference in its entirety.

Figure 1:
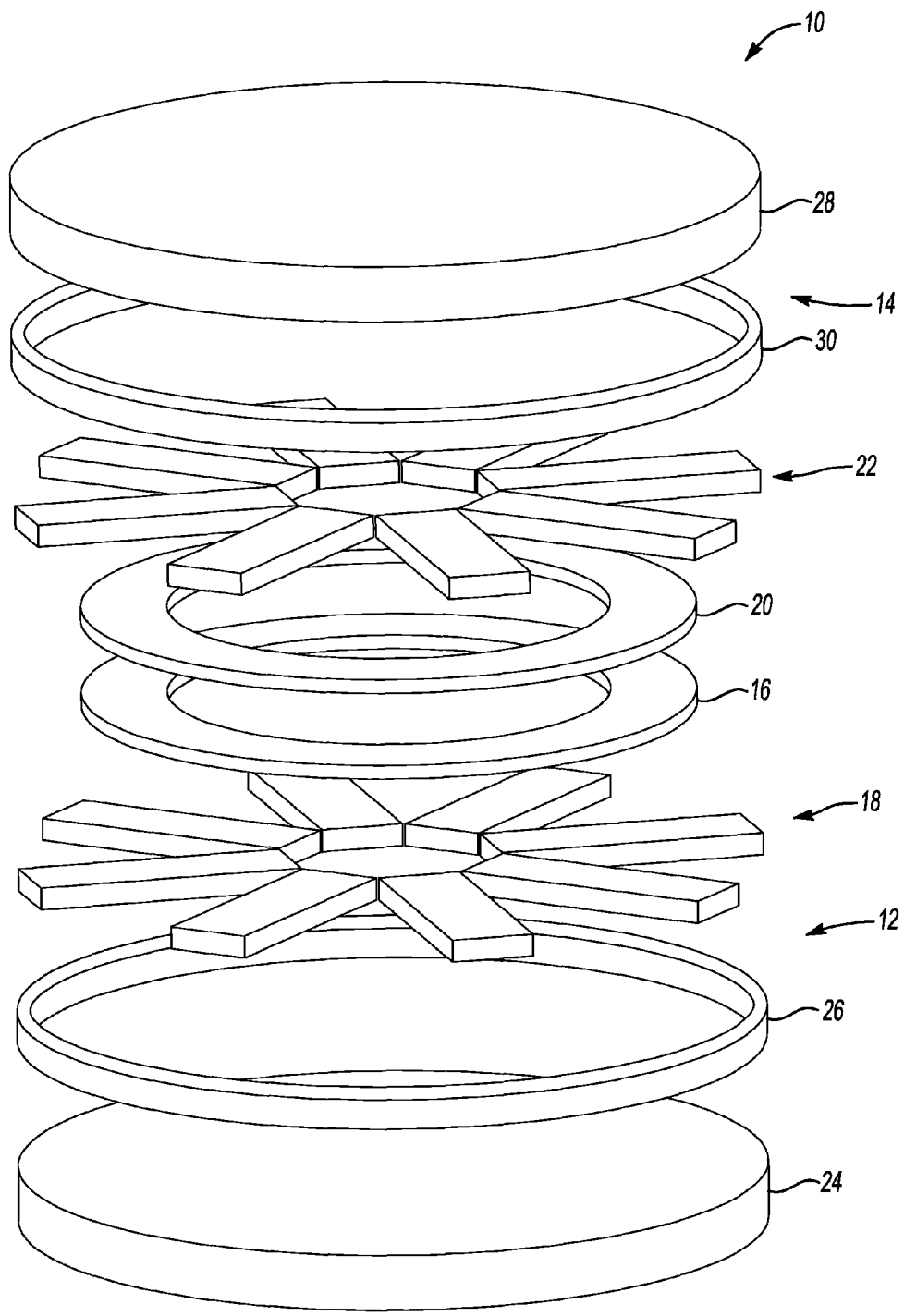
FIG. 1 depicts an exploded view of a coil assembly used in connection with an inductive charging system.

FIG. 1 depicts an exploded view of a coil assembly 10 as used in connection with an inductive charging system. The coil assembly 10 generally includes a primary side 12 and a secondary side 14. The primary side 12 includes a primary coil 16 and a plurality of ferrites 18. The ferrites 18 are radially positioned about an axis that extends through the primary coil 16. Likewise, the secondary side 14 includes a secondary coil 20 and a plurality of ferrites 22. The ferrites 22 are radially positioned about an axis that extends through the secondary coil 20. In general, the primary side 12 is physically spaced apart from the secondary side 14. In the event the inductive coil assembly 10 is incorporated into a vehicle 13 for purposes of charging one or more vehicle batteries, one or more of the primary sides 12 may be positioned on a base pad 15 and one or more of the secondary sides 14 may be positioned on the vehicle (not shown) itself. The base pad 15 may be positioned underneath the vehicle 13 and is separate from the vehicle 13.

The primary coil 16 of the primary side 12 is capable of enabling energy transfer via magnetic induction and resonant operation at a predetermined frequency to the secondary coil 20 of the secondary side 14 to provide wireless charging of the battery. In general, magnetic flux from the primary coil 16 (when energized) may be directed towards the secondary coil 20 to provide for efficient energy transfer and stronger magnetic coupling. As noted above, the primary coil 16 and the secondary coil 20 combine with one another to form an electrical transformer (e.g., a loosely coupled transformer action is created). The primary coil 16 creates a magnetic field and transmits the same to the secondary coil 20. In turn, the secondary coil 20 generates voltage in response to the magnetic field which is then converted into electrical current. The voltage and current are used to charge the battery.

Each of the primary coil 16 and the secondary coil 20 may comprise any number of coils or Litz wires turns. An inner diameter and outer diameter of the primary coil 16 and the secondary coil 20 may be adjusted to increase mutual conductance (M) between the coils 16, 20 and to increase a quality factor (Q). Each of the ferrites 18 positioned about the primary coil 16 may be generally uniformly and angularly spaced apart from one another. Likewise, each of the ferrites 22 positioned about the secondary coil 20 may be generally uniformly and angularly spaced apart from one another. The ferrites 18, 22 may provide for a low reluctance path and guide the magnetic flux at an end of the primary coil 16 and the secondary coil 20, respectively. The ferrites 18, 22 increase the self-inductance of each coil 16, 20 and assist in guiding the flux.

The primary side 12 includes a first cap 24 for supporting the primary coil 16 and the ferrites 18. The primary side 12 further includes a first ring 26 to surround the ferrites 18 for shielding purposes. The secondary side 14 includes a second cap 28 for supporting the secondary coil 20 and the ferrites 22. The secondary side 14 includes a second ring 30 to surround the ferrites 22 for shielding purposes. It is recognized that each of the first cap 24, the first ring 26, the second cap 28, and the second ring 30 may be formed of aluminum, conductive plastic or any combination thereof.

Figure 2:
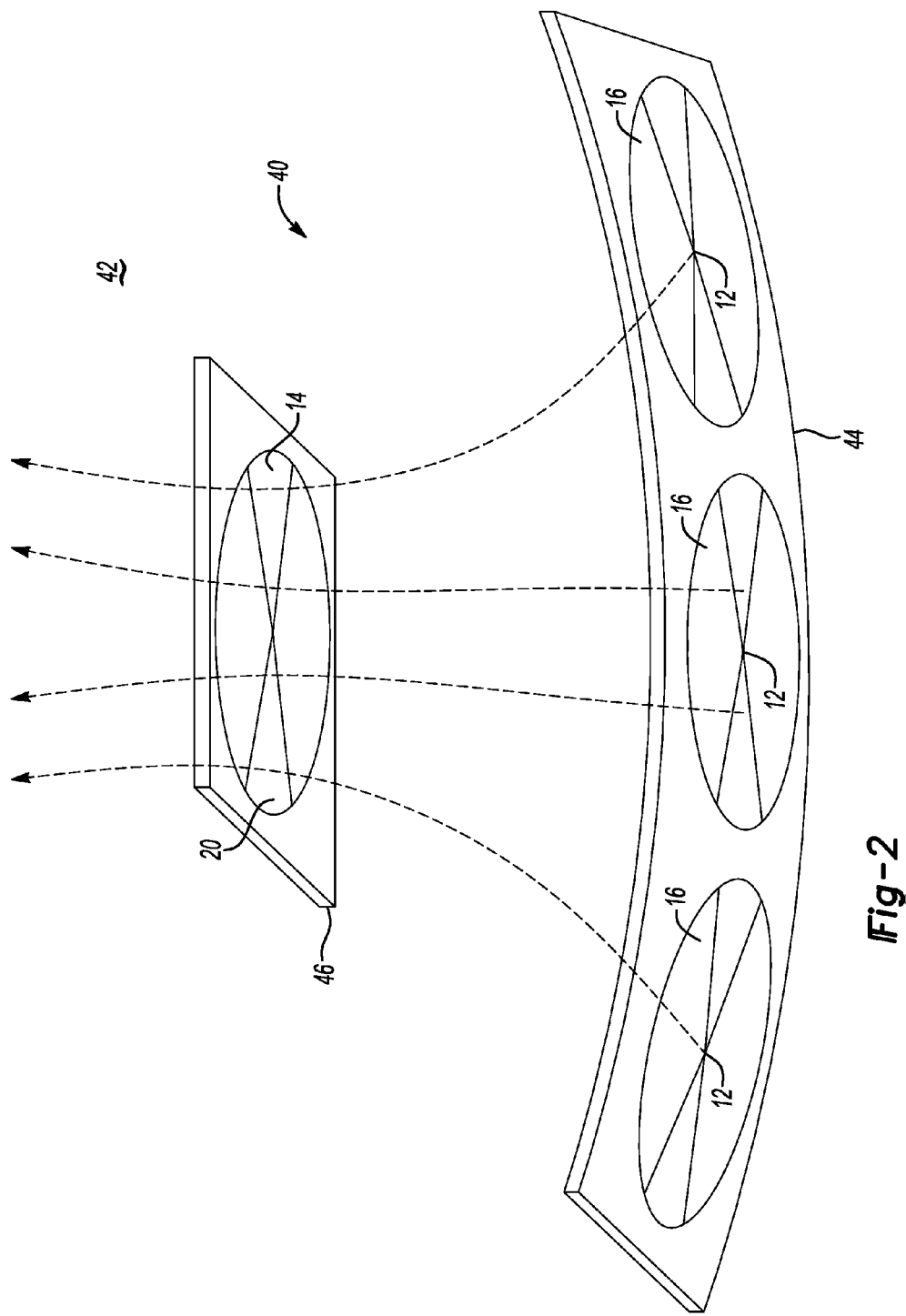
FIG. 2 depicts a first coil assembly for charging a vehicle in accordance to one embodiment.

FIG. 2 depicts a first coil assembly 40 for charging a vehicle 42 in accordance to one embodiment. The first coil assembly 40 includes a plurality of primary sides 12 and a secondary side 14. A first base plate 44 is provided for supporting the plurality of primary sides 12. A second base plate 46 is provided to support the secondary side 14. The second base plate 46 is coupled to the vehicle 42. The first base plate 44 and the second base plate 46 are separated by a distance L. The first base plate 44 is positioned on a structure (not shown) off of the vehicle 42. Each of the first base plate 44 and the second base plate 46 generally comprises aluminum, magnetic materials such as Permalloy or Mu-Metal (with higher permeability), conductive plastic, or conductive plastic loaded with magnetic material to provide shielding against low frequency magnetic fields. The aluminum and the magnetic material of the first base plate 44 and the second base plate 46 may provide magnetic and electric shielding. In the event the second base plate 46 is formed of conductive plastic, such a condition may reduce the overall weight of the vehicle 42. It is also recognized that first base plate 44 and the second base plate 46 may include ferrites (e.g., individual ferrite bars) or a ferrite mat for additional flux focusing. The ferrite mat may be used in place of the individual ferrite bars between the coils and the plate. The ferrite mat may be positioned on the ground and include the primary coil 16. The ferrite mat may then be positioned below the primary coil 16. In the event the ferrite mat is positioned on the vehicle 42, the ferrite mat may be positioned above the secondary coil 20.

In general, the primary coils 16 and the secondary coil 20 may include any number of coils and may be curved. The first base plate 44 may be curved or elevated in order to focus the electromagnetic flux from the primary coils 16 and the secondary coil 20. The magnetic flux as transmitted from the primary coil 16 may be emitted at an angle that is generally perpendicular to the primary coil 16. Thus, by inclining or curving at least a portion of the primary coil 16 and/or inclining or curving the first base plate 44, such a condition may allow the magnetic flux to be directed to the secondary coil 20 to provide a concentrated flow of the magnetic flux thereto. This condition may increase mutual inductance, coupling, and energy transfer between the primary coil 16 and the secondary coil 20.

This condition may also reduce coil-to-coil distance between the primary coils 16 and the secondary coil 20. In another embodiment, the first base plate 44 may be planar, however at predetermined locations thereabout, the primary coils 16 may be inclined or curved with respect to the first base plate 44 to focus the magnetic flux from the primary coils 16 onto the secondary coil 20. It is contemplated that the first base plate 44 and/or the primary coil(s) 16 may be arranged in any manner to achieve an incline or curve thereof for directing the magnetic flux to the secondary coil 20 to increase mutual inductance.

The primary coil 16 and the secondary coil 20 may include a low loss Litz wire to minimize AC resistance due to frequency dependent effects. The various strands of Litz wire may be twisted to further reduce AC resistance. By reducing the AC resistance, the Q factor may be increased thereby providing improved energy transfer from the primary side 12 to the secondary side 14 thus exhibiting a reduction in losses in the various windings of the primary coil 16 and the secondary coil 20.

Figure 3:
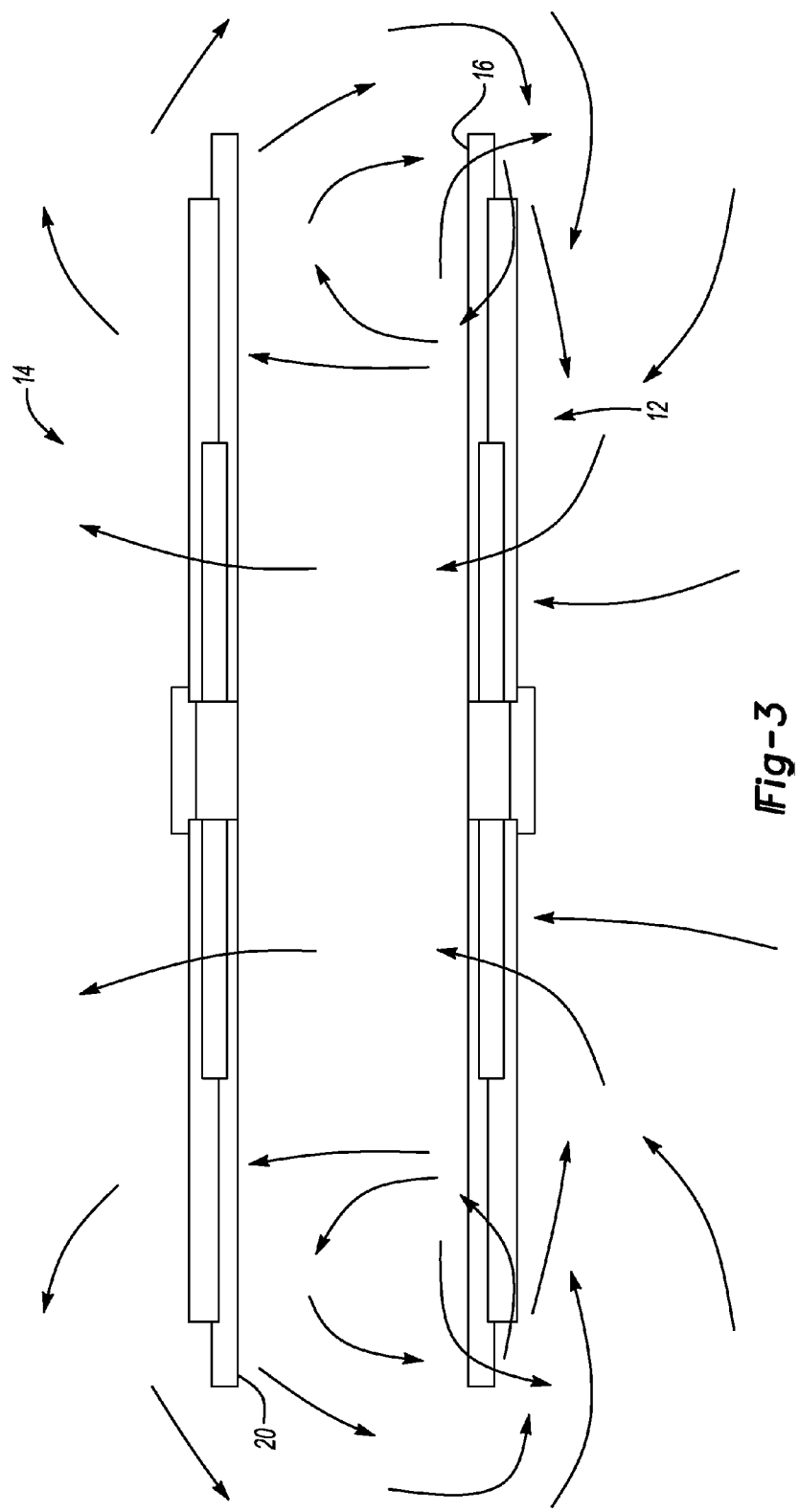
FIG. 3 depicts a view of a planar primary coil and planar secondary coil.

FIG. 3 depicts a view of a planar primary side 12 and a planar secondary side 14. Various coil parameters are illustrated for the primary coil 16 and the secondary coil 20. Various parameters associated with the coils 16 and/or 20 include the following. For example, the outer diameter 48 may be 718 mm, the inner diameter 49 may be 398 mm, ferrite distance may be 100 mm, coil to coil distance (e.g., L) may be 96 mm, coil thickness may be 2 mm, 40 turns may be provided at a 1:1 ratio, and ferrite permeability may be 1000. A total number of eight ferrites, for example, may be placed under each coil with 45 degrees separation. The ferrite dimensions may be 300×25×10 mm. The primary inductance may be 1.60 mH, the secondary inductance may be 1.60 mH, the mutual inductance may be 0.9 mH, and a coupling factor of 0.56 may be provided.

Figure 4:
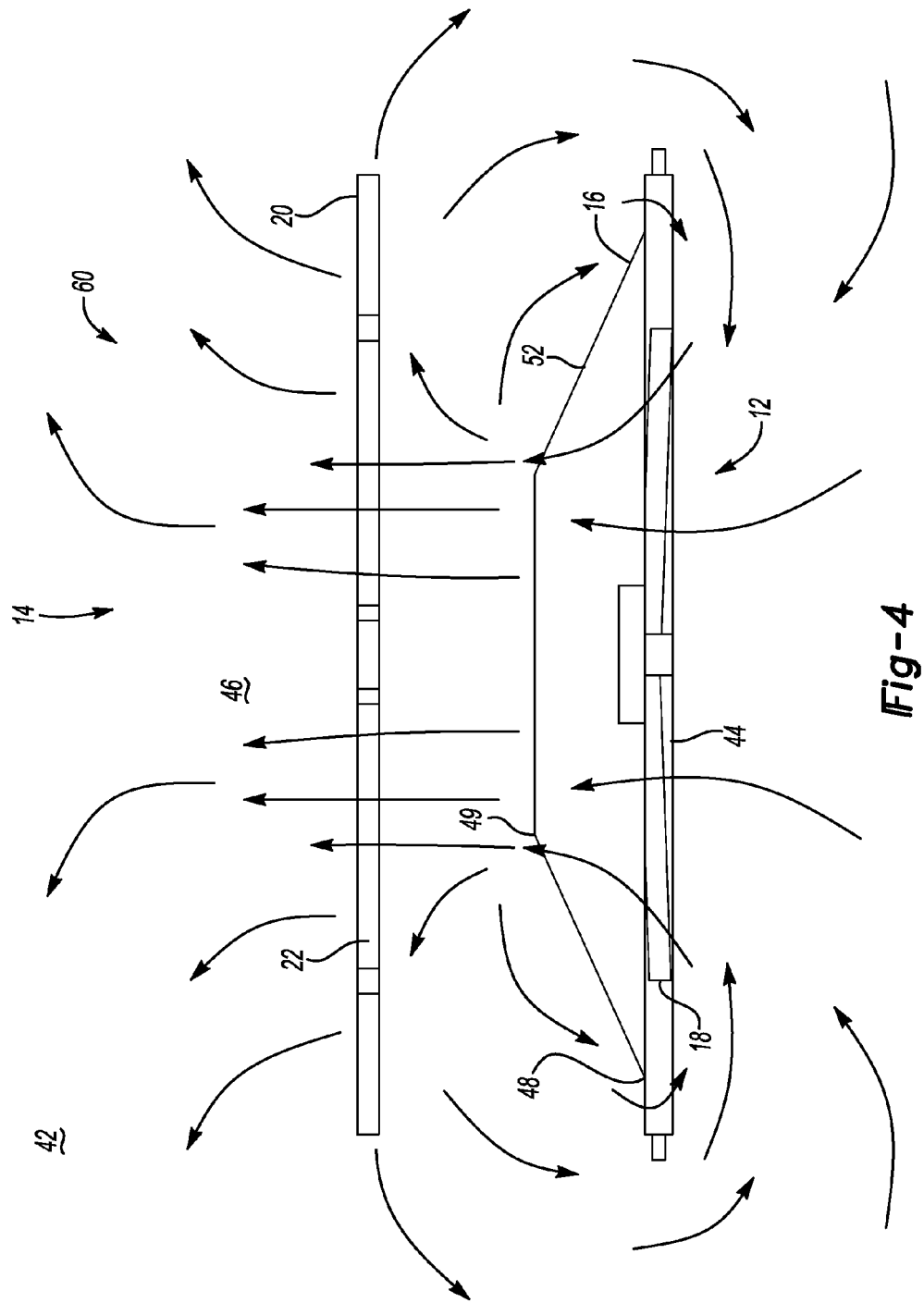
FIG. 4 depicts a third coil assembly for charging the vehicle in accordance to one embodiment.

FIG. 4 depicts a third coil assembly 60 for charging the vehicle 42 in accordance to one embodiment. The third coil assembly 60 includes a primary coil 16 that is shaped in the form of a frustum to focus the flux from the primary coil 16 to the secondary coil 20.

As shown, the primary coil 16 may be shaped in the form of a frustum to incline (or to provide for an elevated portion) on a top side 52 thereof for focusing the magnetic flux from the primary coil 16 to the secondary coil 20. The primary coil 16 has an outer diameter 48 and an inner diameter 49. As seen from FIG. 4, the primary coil 16 inclines from the outer diameter 48 to the inner diameter 49, or the inner diameter 49 is elevated in relation to outer diameter 48. The frustum shaped primary coil 16 (or inclined/elevated portion of the primary coil 16) may increase mutual inductance, coupling, and energy transfer between the primary coil 16 and the secondary coil 20 when compared to the planar primary and secondary side implementation of FIG. 3 which effectively maintains a similar distance between the first and the second base plates 44 and 46.

The effective coil-to-coil distance in the frustum implementation may be reduced as well. However, it is recognized that the ferrites 18, 22 and the first and second base plates 44, 46 may still maintain a constant distance regardless of the distance between the elevated primary coil 16 and the secondary coil 20. In this case, the coupling between the primary coil 16 and the secondary coil 20 may be increased with the placement of each subsequent turn in the primary coil 16 by which a gradient is provided over N number of turns. In addition, using the centroid of the inclined primary coil 16, an equivalent coupling coefficient (k) can be approximated for two planar coils with the first and the second base plates 44, 46 being positioned at a closer distance. It is contemplated that a support structure (not shown) may be positioned underneath the primary coil 16 to support and/or maintain the frustum structure (or inclined structure) of the primary coil 16. The ferrites 18 guide the magnetic flux from the inclined or elevated portion from the primary coil 16 to the secondary coil 20.

Various parameters associated with the coils 16 and/or 20 as depicted in FIG. 4 may include the following. For example, the outer diameter 48 may be 716 mm, the inner diameter 49 may be 398 mm, ferrite distance may be 100 mm, coil to coil distance (e.g., L) may be 56.5 mm, coil thickness may be 2 mm, 40 turns may be provided at a 1:1 ratio, and ferrite permeability may be 1000. A total number of eight ferrites, for example, may be placed under each coil with 45 degrees separation. The ferrite dimensions may be 300×25×10 mm. The primary inductance may be 1.60 mH, the secondary inductance may be 1.60 mH, the mutual inductance may be 0.9 mH, and a coupling factor of 0.56 may be provided.

Figure 5:
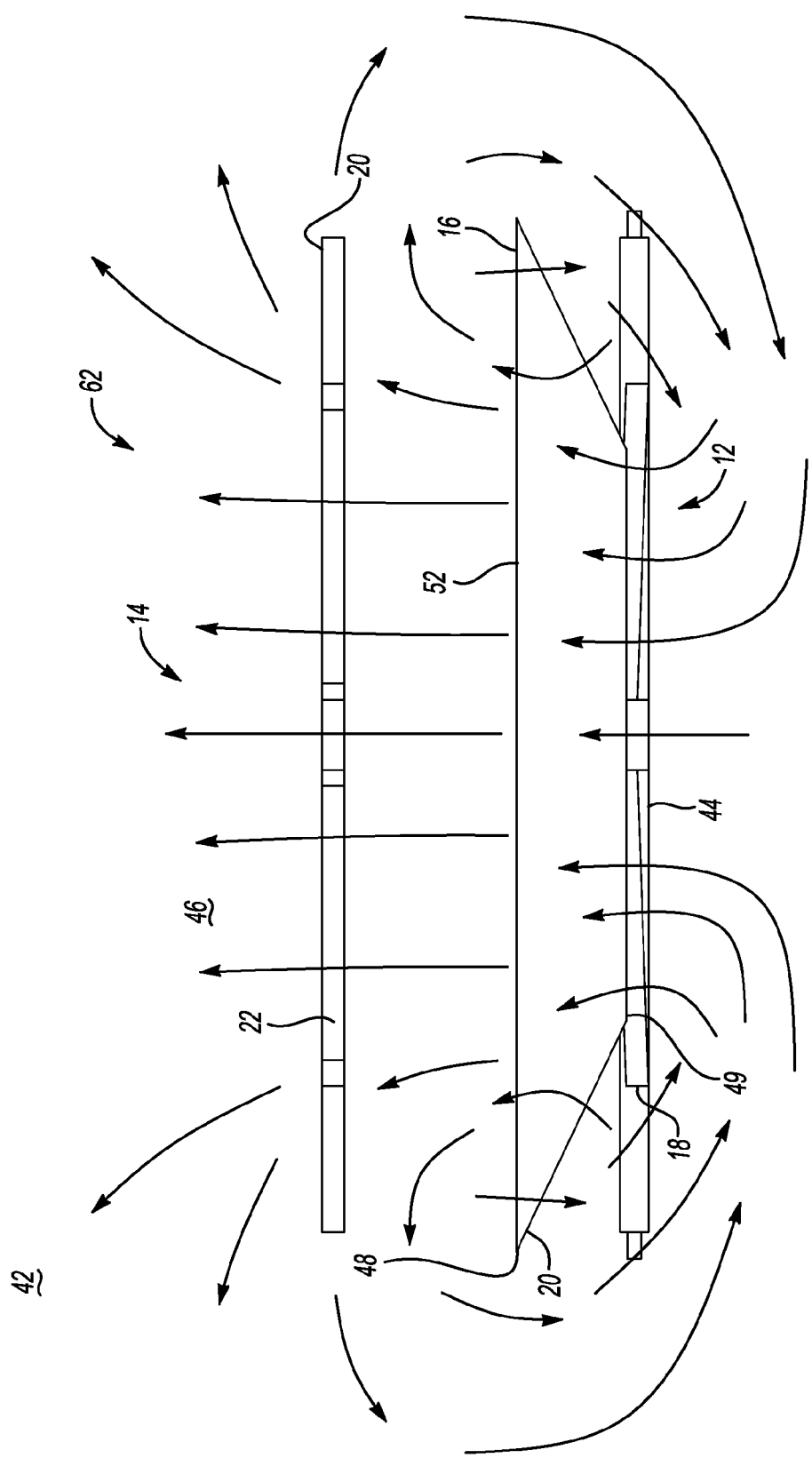
FIG. 5 depicts a fourth coil assembly for charging the vehicle in accordance to one embodiment.

FIG. 5 depicts a fourth coil assembly 62 for charging the vehicle 42 in accordance to one embodiment. As shown, the primary coil 16 may be shaped in the form of an inverted frustum to provide for an elevated portion on the top side 52 to focus the magnetic flux from the primary coil 16 to the secondary coil 20 and to reduce the coil to coil distance between the primary coil 16 and the secondary coil 20. As seen in FIG. 5, the primary coil 16 inclines from the inner diameter 49 to the outer diameter 48, or the outer diameter 48 is elevated in relation to inner diameter 49. The various attributes noted in connection with the third coil assembly 60 may generally apply to the fourth coil assembly 62. The various coil parameters as noted in connection with the third coil assembly 60 may be similar to or differ than those exhibited with the coil parameters of fourth coil assembly 62. For example, the outer diameter 48 may be 716 mm, the inner diameter 49 may be 398 mm, ferrite distance may be 100 mm, coil to coil distance (e.g., L) may be 56.5 mm, coil thickness may be 2 mm, 40 turns may be provided at a 1:1 ratio, and ferrite permeability may be 1000. A total number of eight ferrites, for example, may be placed under each coil with 45 degrees separation. The ferrite dimensions may be 300×25×10 mm. In addition, the primary inductance may be 1.58 mH, the secondary inductance may be 1.62 mH, the mutual inductance may be 1.01 mH, and a coupling factor of 0.54 may be provided.

Figure 6:
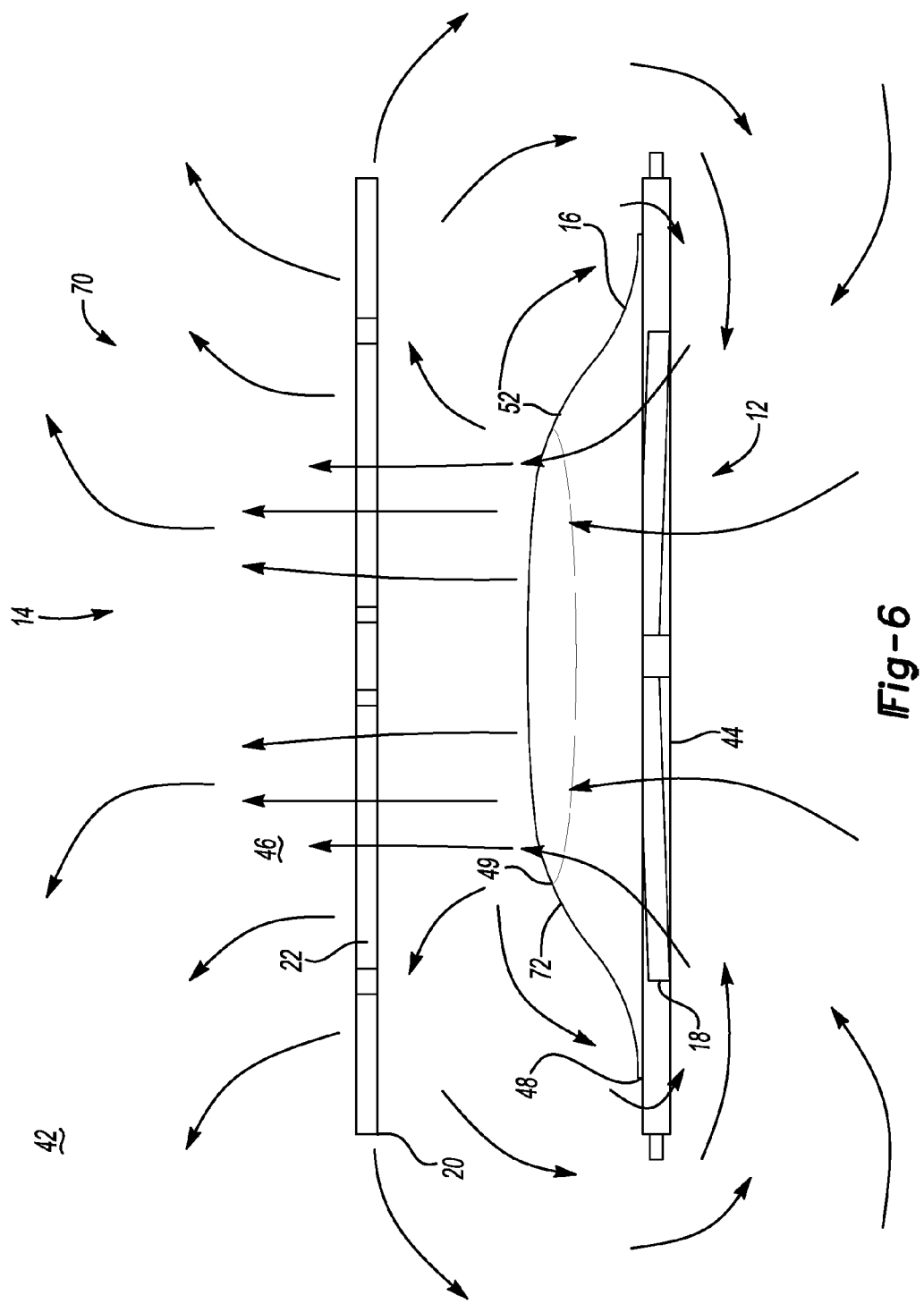
FIG. 6 depicts a fifth coil assembly for charging the vehicle in accordance to one embodiment.

FIG. 6 depicts a fifth coil assembly 70 for charging the vehicle 42 in accordance to one embodiment. As shown, the primary coil 16 may include a curved portion 72 (or elevated portion) on the top side 52 to focus the magnetic flux from the primary coil 16 to the secondary coil 20 and to reduce the coil to coil distance between the primary coil 16 and the secondary coil 20. While FIG. 6 generally illustrates that the curved portion 72 generally faces upward toward the secondary coil 20, it is recognized that the curved portion 72 may be orientated to face downward or away from the secondary coil 20. The curved portion 72 may extend uniformly around the primary coil 16, or alternatively, the primary coil 16 may include the curved portion 72 at a portion of the top surface 52 whereas remaining areas of the top surface may be implemented in a different manner (e.g., inclined or elevated).

In general, it is recognized that the shape or form of the primary coil and/or the secondary coil may vary so long as the primary coil and/or the secondary coil may exhibit an inclined, curved, or elevated formation to increase mutual inductance, the coupling and energy transfer for charging one or more batteries.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An inductive charging coil assembly for a vehicle comprising:
   a first base plate including at least one first coil thereon for receiving magnetic flux to charge a vehicle battery;
   a second base plate including at least one second coil having a top surface thereof that forms an elevated portion to focus the magnetic flux to the at least one first coil; and
   a first plurality of ferrites, each ferrite being co-planar and extending in a different radial direction from a first center point about the at least one second coil for guiding the magnetic flux from the elevated portion to the at least one first coil.

2. The assembly of claim 1 wherein the second coil is a primary coil.

3. The assembly of claim 1 wherein the second coil includes an inner diameter and an outer diameter.

4. The assembly of claim 3 wherein the inner diameter is elevated in relation to the outer diameter thereby forming the elevated portion.

5. The assembly of claim 3 wherein the outer diameter is elevated in relation to the inner diameter thereby forming the elevated portion.

6. The assembly of claim 1 wherein the elevated portion is a curved portion.

7. The assembly of claim 1 wherein the first base plate and the second base plate are each formed of one of aluminum, a first magnetic material, a first conductive plastic, and a second conductive plastic including a second magnetic material.

8. The assembly of claim 1 wherein the first base plate and the second base plate are each formed of one of aluminum, a first magnetic material, a first conductive plastic, and a second conductive plastic including a second magnetic material.

9. The assembly of claim 1 further comprising a second plurality of ferrites, each ferrite being co-planar and extending in a different radial direction from a second center point about the at least one first coil to receive the magnetic flux, wherein the second center point extends vertically through the at least one first coil.

10. An inductive charging coil assembly for a vehicle comprising:
   a first base plate including a secondary coil thereon for receiving magnetic flux to charge a vehicle battery;
   a second base plate including at least one primary coil having a top surface thereof that forms an elevated portion to focus the magnetic flux to the secondary coil; and
   a first plurality of ferrites, each ferrite being co-planar and extending in a different radial direction from a first center point about the at least one primary coil for guiding the magnetic flux from the elevated portion to the secondary coil.

11. The assembly of claim 10 wherein at least one primary coil includes an inner diameter and an outer diameter.

12. The assembly of claim 11 wherein the inner diameter is elevated in relation to the outer diameter thereby forming the elevated portion.

13. The assembly of claim 11 wherein the outer diameter is elevated in relation to the inner diameter thereby forming the elevated portion.

14. The assembly of claim 10 wherein the elevated portion is a curved portion.

15. The assembly of claim 10 further comprising a second plurality of ferrites, each ferrite being co-planar and extending in a different radial direction from a second center point about the secondary coil to receive the magnetic flux, wherein the second center point extends vertically through the secondary coil.

16. An inductive charging coil assembly for a vehicle comprising:
   a first base plate including a secondary coil thereon for receiving magnetic flux to charge a vehicle battery;
   a first plurality of ferrites, each ferrite being co-planar and extending in a different radial direction from a first center point about the secondary coil to receive the magnetic flux; and
   a second base plate including at least one primary coil including an elevated portion to focus the magnetic flux to the secondary coil.

17. The assembly of claim 16 wherein the at least one primary coil includes an inner diameter and an outer diameter.

18. The assembly of claim 17 wherein the inner diameter is elevated in relation to the outer diameter thereby forming the elevated portion.

19. The assembly of claim 17 wherein the outer diameter is elevated in relation to the inner diameter thereby forming the elevated portion.

20. The assembly of claim 16 further comprising a second plurality of ferrites, each ferrite being co-planar and extending in a different radial direction from a second center point about the at least one primary coil for guiding the magnetic flux from the elevated portion to the secondary coil, wherein the second center point extends vertically through the at least one primary coil.

* * * * *